UNITED STATES PATENT OFFICE.

THOMAS AUSTIN MITCHELL, OF READING, MASSACHUSETTS, ASSIGNOR TO MERRIMAC CHEMICAL COMPANY, OF NORTH WOBURN, MASSACHUSETTS, A CORPORATION OF MASSACHUSETTS.

METHOD OF MAKING METALLIC ARSENATES.

1,183,316.  Specification of Letters Patent.  Patented May 16, 1916.

No Drawing.   Application filed July 23, 1915.   Serial No. 41,498.

*To all whom it may concern:*

Be it known that I, THOMAS A. MITCHELL, a citizen of the United States, residing at Reading, in the county of Middlesex and State of Massachusetts, have invented certain new and useful Improvements in Methods of Making Metallic Arsenates, of which the following is a specification.

This invention relates to a novel method whereby arsenates of lead, or other metallic arsenates, may be prepared directly and in a single operation from the corresponding metals.

The present commercial processes of making arsenate of lead utilize litharge as a source of lead, in conjunction with either sodium arsenate or arsenic acid. Inasmuch as the litharge must be prepared from metallic lead by a preliminary operation, it is obvious that a method which yields the arsenate directly from metallic lead, and without any expenditure of power for the electrolysis of solutions, represents a material industrial advance.

According to the present invention, I prepare a strong aqueous solution of arsenic acid, and add thereto a small quantity, say about three per cent. by weight, of a suitable solvent for lead, preferably nitric acid, although acetic or other acids will serve the purpose. In the solution thus prepared I immerse metallic lead, preferably in the form of plates, sheets, or ingots, although it may be subdivided in order to present a greater surface. The solution is then warmed in order to accelerate the reaction. The nitric acid reacts with the lead, producing lead nitrate, which in turn reacts with the arsenic acid, precipitating lead arsenate and again setting free the nitric acid, this cycle being repeated until all of the arsenic acid present has entered into combination. If sufficient metallic lead is present to combine with practically all of the dissolved arsenic acid, the product will consist essentially of lead arsenate, with traces of arsenic acid, nitric acid, and nitrate of lead, or of lead acetate, and the corresponding acids in case these have been used.

The proportion of arsenic acid and of lead may be varied to produce either the tri-, di-, or mono-basic arsenate, or mixtures of these salts, as may be desired. I have observed that small amounts of oxids of nitrogen are formed during the process, but the losses due thereto are practically negligible, as indicated by the observed fact that the quantity of nitric acid existing in solution at the end of the process is approximately the same as at the beginning. This also indicates that the nitric acid and its equivalents act as carriers for the lead, or as catalysts for the reaction; and the term "catalyst" is employed herein as indicating any substance having a solvent action upon the metal and capable of performing a like function.

The reaction is preferably carried out at about 60° centigrade, the heat being applied under such conditions as gradually to concentrate the solution as the arsenic acid unites with the lead. By this means the concentration of the solution is more or less maintained as the reaction proceeds, with the result that the formation of the lead arsenate takes place under approximately constant conditions and yields a practically uniform product. At the close of the operation the precipitate is filtered off, and the pasty mass is washed and constitutes the commercial product.

Example: 100 kilos of arsenic acid solution testing 70° Baumé and containing about 60 per cent. of arsenic pentoxid ($As_2O_5$), are placed in a stoneware vessel, and mixed with about three per cent. of commercial nitric acid; 120 kilos of metallic lead are then submerged therein. The contents of the vessel are preferably warmed to about 60° C., in order to hasten the reaction, although the reaction may be conducted more slowly at lower temperatures. The arsenate of lead is formed as a white deposit. The waste liquor contains small amounts of arsenic acid, nitrate of lead, and nitric acid, and may be utilized in a repetition of the process. The reaction can be carried out in any desirable vessel, means being provided to concentrate the solution while the reaction proceeds to completion.

Aside from avoiding the necessity of preparing litharge from metallic lead, as in the present commercial processes, the present method is also advantageous as compared with those now in use in that it avoids the production of nitrate or acetate of sodium as a by-product of reaction.

While I have described my method as applied to the preparation of arsenates of lead, the same is directly applicable to the preparation of other metallic arsenates, including those of copper and zinc, by substituting the corresponding metal for the metallic lead.

I claim:—

1. The method of making a metallic arsenate, which consists in immersing the metal of which the arsenate is desired in an aqueous solution of arsenic acid in presence of a suitable catalyst having a solvent action upon the metal.

2. The method of making an arsenate of lead, which consists in immersing metallic lead in an aqueous solution of arsenic acid in presence of a suitable catalyst having a solvent action upon lead.

3. The method of making an arsenate of lead, which consists in immersing metallic lead in an aqueous solution of arsenic acid in presence of a small proportion of an acid solvent for lead.

4. The method of making an arsenate of lead, which consists in immersing metallic lead in an aqueous solution of arsenic acid in presence of a small proportion of nitric acid.

5. The method of making an arsenate of lead, which consists in immersing metallic lead in an aqueous solution of arsenic acid in presence of a suitable catalyst having a solvent action upon lead, and heating and concentrating the solution as the reaction proceeds.

6. The method of making an arsenate of lead, which consists in immersing metallic lead in an aqueous solution of arsenic acid in presence of a small proportion of an acid solvent for lead, and heating and concentrating the solution as the reaction proceeds.

7. The method of making an arsenate of lead, which consists in immersing metallic lead in an aqueous solution of arsenic acid in presence of a small proportion of nitric acid, and heating and concentrating the solution as the reaction proceeds.

In testimony whereof I affix my signature in presence of two witnesses.

THOMAS AUSTIN MITCHELL.

Witnesses:
  B. ZAHORSKI,
  KEBE TOABE.